(12) United States Patent
Zhang et al.

(10) Patent No.: US 8,420,033 B2
(45) Date of Patent: Apr. 16, 2013

(54) COMPOSITIONS AND METHODS TO SEQUESTER FLUE GAS MERCURY IN CONCRETE

(75) Inventors: Yinzhi Zhang, Hudson, OH (US); Qunhui Zhou, Hudson, OH (US); Sidney G. Nelson, Hudson, OH (US)

(73) Assignee: Albemarle Corporation, Baton Rouge, LA (US)

( * ) Notice: Subject to any disclaimer, the term of this patent is extended or adjusted under 35 U.S.C. 154(b) by 630 days.

(21) Appl. No.: 12/305,720

(22) PCT Filed: Nov. 23, 2007

(86) PCT No.: PCT/US2007/085474
§ 371 (c)(1),
(2), (4) Date: Dec. 19, 2008

(87) PCT Pub. No.: WO2008/064360
PCT Pub. Date: May 29, 2008

(65) Prior Publication Data
US 2010/0212550 A1 Aug. 26, 2010

Related U.S. Application Data

(60) Provisional application No. 60/860,563, filed on Nov. 22, 2006.

(51) Int. Cl.
*B01D 47/00* (2006.01)
*B01D 53/46* (2006.01)
*B01D 53/56* (2006.01)
*B01D 53/86* (2006.01)
*B01J 8/00* (2006.01)
*B01J 20/00* (2006.01)

(52) U.S. Cl.
USPC .................. 423/210; 502/400; 502/418

(58) Field of Classification Search .................. None
See application file for complete search history.

(56) References Cited

U.S. PATENT DOCUMENTS 5,356,849 A 10/1994 Matviya et al.
6,027,551 A 2/2000 Hwang et al.
(Continued)

OTHER PUBLICATIONS

Zhang, et al; Development of a New Method to Replace the Foam Index Test; 2007 World of Coal Ash; May 7-10, 2007; Covington, Kentucky, USA.

*Primary Examiner* — Emily Le
*Assistant Examiner* — Michael Forrest
(74) *Attorney, Agent, or Firm* — Marcy M. Hoefling; Jeremy J. Kliebert; James A. Jubinsky (57) ABSTRACT

Mercury adsorbed from combustion gas by activated carbon can be sequestered in concrete containing air entraining admixtures. The activated carbon may be made by providing a carbon char made from anthracite or low-volatile bituminous coal that was devolatilized and carbonized in an oxygen-depleted environment and activating this char in the presence of steam to provide an activated carbon with an acid blue 80 index of less than about 30 milligrams per gram of carbon. The activated carbon may also be made by providing a carbon char that was devolatilized and carbonized in an oxygen-depleted environment and activating this char in the presence of oxygen to provide an activated carbon. The carbon may be injected into a combustion gas stream containing fly ash and mercury and may then be removed with fly ash from the gas stream. The resulting composition may be used as a partial substitute for cement in air-entrained concretes.

26 Claims, 8 Drawing Sheets

U.S. PATENT DOCUMENTS

| | | |
|---|---|---|
| 6,890,507 B2 | 5/2005 | Chen et al. |
| 6,953,494 B2 | 10/2005 | Nelson, Jr. |
| 2003/0206843 A1* | 11/2003 | Nelson, Jr. .................... 423/210 |
| 2004/0206276 A1* | 10/2004 | Hill et al. ...................... 106/708 |
| 2006/0204418 A1* | 9/2006 | Chao et al. .................... 423/210 |
| 2006/0204430 A1 | 9/2006 | Bool et al. |

* cited by examiner

Air Entrained in Concrete with Powdered Activated Carbons

COMPOSITIONS AND METHODS TO SEQUESTER FLUE GAS MERCURY IN CONCRETE

CROSS-REFERENCES TO RELATED APPLICATIONS

This application claims the priority of U.S. Provisional Application No. 60/860,563, filed Nov. 22, 2006, entitled "Compositions and methods to sequester flue gas mercury in concrete," which is hereby incorporated by reference as if fully recited herein.

STATEMENT REGARDING FEDERALLY SUPPORTED RESEARCH OR DEVELOPMENT

The invention was made with support from the U.S. government under cooperative agreements awarded under U.S. National Science Foundation Award Numbers DMI-0232735 and DMI-0349752. The United States Government may own certain rights to the present invention.

BACKGROUND OF THE INVENTION

This invention relates to novel compositions for cementitious and pozzolanic applications. More specifically, this invention relates to novel cementitious and pozzolanic compositions that contain mercury captured from coal-fired flue gases that is sequestered by a carbon mercury adsorbent inside of a concrete that will not fracture and disintegrate when undergoing freeze-thaw cycles. This invention also relates to methods for the production of the carbonaceous mercury adsorbents within the cementitious compositions and methods for the production of hardened, air-entrained structures from the compositions.

Fly ash created from the combustion of coal is frequently used as a partial replacement for cement in concretes and mortars. Effluent gas from the combustion of coal contains mercury. This contaminant may be adsorbed by powdered activated carbon (PAC) injected into the flue gas stream and collected with the fly ash in a particulate removal device. For example, a brominated PAC manufactured for mercury sorption is provided by U.S. Pat. No. 6,953,494, by one of the inventors, the contents of which are incorporated by reference herein. However, when prior art PAC sorbents used for mercury emission control become mixed in with the fly ash from coal-fired power plants, the ash can no longer be sold for its highest-value use, as a replacement for cement in concretes. This is because the highly-adsorptive PAC used for capturing the mercury also adsorbs the air-entraining admixture (AEA) chemicals later added to the concrete slurry to generate the air bubbles required for concrete workability and freeze-thaw capabilities.

Over 20% of the fly ash generated by United States power plants, over 15 million tons per year, is currently sold for concrete and mortar use, rather than being disposed of in landfills. Efforts are underway to increase this amount. This fly ash substitutes for a portion of the costly manufactured portland cement in the concrete or mortar mix. Most of this concrete is used in road-building and structures far from human exposure.

The economic benefits of using fly ash to replace a fraction of the cement in concrete include increased revenue from the sale of the ash, reduced costs for fly ash disposal, and savings from using the ash in place of the more costly cement. Concrete performance benefits include greater resistance to chemical attack, increased strength, and improved workability. Environmental benefits include reduced greenhouse gas emissions, reduced land disposal, and reduced virgin resource use. All of these benefits are lost if fly ash compositions contain prior-art mercury sorbents beyond de minimis levels. This is doubly negative, because not only must the fly ash be disposed of rather than beneficially used, but the opportunity is missed to physically and chemically sequester the mercury from release and interactions with the environment by encasing it the concrete.

In 2005, the U.S. Environmental Protection Agency promulgated its Clean Air Mercury Rule, requiring coal-fired power plants to reduce their mercury emissions for the first time. Moreover, numerous states have already required swifter and high mercury reduction levels. The State of Illinois, for example, with around 50 large coal-fired utility boilers, has effectively required 90% mercury reductions by mid 2009. Pennsylvania has required 80% removal beginning in 2010.

For the majority of these coal-fired power plants, those without sulfur-dioxide wet scrubbers, the lowest-cost, leading-candidate technology to comply with the new mercury emission reduction requirements is the injection of PAC into the flue gas in front of the plants' existing particulate controls. In this process, however, the PAC gets mixed in with the plant's collected fly ash. Because of the high surface area of typical PACs and their high adsorption capacity, if even the smallest amount gets mixed in with fly ash, the fly ash can no longer be used in concrete. The PAC adsorbs the air-entraining admixture (AEA) chemicals later added to the concrete slurry. These surfactants generate the precise amount of air bubbles needed to create the air voids required for concrete workability and freeze-thaw capabilities. For plants that could otherwise sell their ash for concrete, but now must dispose of it, this would be a big economic loss. U.S. Department of Energy National Energy Technology Laboratory analyses indicate that this deleterious by-product effect would effectively quadruple the cost of mercury reductions at some plants.

Mercury emissions from cement kilns are also increasingly recognized as a problem. PACs could similarly be injected into these exhaust gases and be collected in the particulate removal devices that separate the cement kiln dust from the exhaust gases. However, because the collected cement kiln dust would then contain AEA-adsorbent PACs, it could no longer be sold as cement for air-entrained concretes.

The prior art includes efforts to make carbon mercury sorbents more concrete-friendly or to improve their mercury performance.

In U.S. Patent Application No. 2003/0206843 by Nelson, one of the current inventors taught that post-treating already-produced powdered activated carbon with a sufficiently-large amount of ozone could beneficially affect the surface of the sorbent enough to decrease its degree of adsorption of AEAs to the extent that fly ashes incorporating them could be used in concretes. Unfortunately, it was also found that because of the high surface area of the activated carbons necessary for power plant mercury control, the amount of ozone required was too great and expensive for this route to have any practical utility. To sufficiently lower the AEA interference in that disclosure, for example, Nelson taught that on the order of 1 kilogram of ozone was required per kilogram of carbon. FIGS. 10 and 11 of the later patent of Chen, U.S. Pat. No. 6,890,507, indicate the same thing.

U.S. Pat. No. 6,027,551 to Hwang teaches that unburned carbon particles from the direct combustion of coal can be separated from fly ash, post-treated with oxygen-rich gas or ozone or nitric acid to create an improved mercury sorbent, and then injected back into the fly ash-containing gas stream to remove mercury. However, this involves processing massive amounts of fly ash to separate the unburned carbon particles, which have minimal mercury adsorption capacity compared to commercially-manufactured powdered activated carbon, and a separate post-treatment step. Moreover, Hwang does not sequester his sorbent mercury away with the fly ash in concretes, but instead separates the carbon from the fly ash.

Rather than post-treating carbons as Nelson, Chen, and Hwang, other methods to directly produce powdered activated carbonaceous materials have been recently proposed. Bool, in U.S. Patent Application No. 2006/0204430, rapidly mixes a very hot, highly-reactive, oxygen-enriched gas stream from a burner directly with a ground or pulverized carbonaceous feedstock to quickly and directly manufacture a powdered activated char that can then be used as a mercury sorbent. The high oxygen concentration, quick and intense mixing, fine particle size, and highly-elevated temperature significantly increase the devolatilization/carbonization rate of the carbonaceous feedstock. This contrasts with traditional, far-slower methods of producing activated carbon where the devolatilization/carbonization step is gradually and separately carried out at lower temperatures on coarse granular or pelletized feedstock in a rotary kiln or on the top levels of a multi-hearth furnace, in an inert, rather than oxygen-enriched, environment. To the enable sale of power plant fly ash as a component for concrete, Bool teaches to not mix his carbon with the fly ash, but to inject the carbon after the fly ash has already been collected in a first particulate collection device. Unfortunately, the Bool sorbent production process requires unique equipment and procedures and cannot be utilized with traditional, commercial equipment or on existing activated carbon production lines.

Therefore, there is a still need for mercury sorbent materials that may be used for mercury sorption in gas streams without impairing the ability of fly ash present in the gas stream to be used as a partial replacement for cement in air-entrained concrete.

SUMMARY OF THE INVENTION

It is one aspect of this invention to create compositions that sequester mercury captured from waste gas streams that are compatible with air-entraining admixtures used in concretes.

It is a further aspect of this invention to create compositions that adsorb mercury from a gas phase, but that, paradoxically, are simultaneously poor adsorbers of air-entraining admixture compounds in a concrete slurry.

It is an additional aspect of this invention to create such compositions without having to separately post-treat them with ozone, nitric acid, or other strong oxidizing agents.

It is an additional aspect of the invention that such compositions may be made using traditional, commercial types of equipment and methods that apply to existing activated carbon production equipment.

It has been discovered that fly ash compositions from coal-fired power plants which contain activated carbon mercury sorbents can, in fact, be utilized in air-entrained concretes if the carbon sorbents are manufactured in such a way so as to possess certain properties. These properties can best be summarized by a new metric, an Acid Blue 80 Index, or ABI. The ABI is a relative measure of the amount of a particular dye, acid blue 80 (CAS 4474-24-2), that the carbon material adsorbs from a standard solution. It can be quantitatively determined using a standard UV-visible light spectrophotometry analysis technique. To enable use sequestering mercury in typical air-entrained concretes, activated carbons must be created with a sufficiently low ABI, at least below 30 mg/g and preferably below 15 mg/g.

The inventors have discovered that a low-ABI carbon mercury sorbent can be produced by activating carbon, at least partially, with air, instead of the typical steam or carbon dioxide during the manufacturing process. If a previously-utilized activated carbon is the feedstock, then it would be the reactivation atmosphere that would contain the air and its oxygen. A low-ABI carbon mercury adsorbent can also be produced utilizing the more traditional steam activation, but then only if starting with an anthracite feedstock, or with low-volatile bituminous coal, and carefully controlling the activation so as not to create too much mesoporosity. To produce carbons with the lowest ABIs, and so the lowest effects on added AEAs, a combination of both an anthracite feedstock and activation in an environment with free oxygen may be recommended.

In one embodiment of the invention, standard activated carbon production equipment can be utilized and no post-treatment processing of the activated carbon is required. In another embodiment of the invention, a coal feedstock is finely ground and pelletized with a binder prior to the devolatilization/carbonization and activation steps. In one embodiment of the invention the devolatilization and carbonization of the carbon feedstock may be accomplished in an oxygen-depleted environment, to prevent excessive combustion of the product. In another embodiment of the invention, prior-art bromine addition to increase the mercury capture effectiveness of the carbon can be integrated into the sorbent manufacturing process. Post-treating the activated carbon with an effective amount of ozone or nitric acid to lower AEA adsorption is unnecessary.

To produce a composition that can successfully lock away captured mercury in a strong, durable, air-entrained concrete, the novel low-ABI PAC and fly ash can be intimately inter-mixed during the mercury removal process at the power plant. This can be accomplished by injecting the PAC into the fly-ash-laden flue gas and collecting them together in a particulate removal device. Low-ABI PAC can also be injected into the mercury-containing exhaust gas of cement kilns, to be collected with the cement kiln dust for use in concretes.

Compositions comprising the low-ABI PAC and fly ash can be combined with AEAs, water, cement, and sand to sequester the captured mercury in a mortar, and with course aggregate, into a concrete. Compositions containing the low-ABI PAC and cement kiln dust can similarly be combined with these materials to sequester captured mercury into mortar or concrete.

BRIEF DESCRIPTION OF THE DRAWINGS

The present invention will be best understood when reference is made to the accompanying drawings.

DETAILED DESCRIPTION OF THE INVENTION

Novel compositions combining carbonaceous mercury sorbents with low Acid Blue 80 Index values and coal combustion fly ash can advantageously sequester mercury from the environment in strong, durable, impermeable, air-entrained concretes. Both materials are important to this end.

A low-ABI carbon is important because it allows the proper amount of AEA to manifest itself in the proper amount of concrete air voids. If the AEA action is interfered with and too few bubbles are produced, then the concrete will fracture when interstitial water freezes and expands. If AEA addition overcompensates and too many bubbles are created, or they are too large, the concrete will fracture due to a lack of strength. But, if the PAC has only a minimal adsorption of AEA, then any natural variations in their proportions will be small, and the intended degree of AEA action and concrete voids will result.

The included fly ash is also important, because high-calcium Type C fly ash has pozzolanic properties. A pozzolan is a siliceous or siliceous and aluminous material, which in itself possesses little or no cementing property, but will, in a finely divided form and in the presence of moisture, chemically react with calcium hydroxide given off by hardening cement to further form compounds possessing cementitious properties. Partially substituting pozzolanic fly ash for a portion of the cement in a concrete results in increased density and long-term pozzolanic action, which ties up free lime, resulting in fewer bleed channels and decreased concrete permeability. Further, the denser resulting concrete helps keep aggressive compounds on the surface, where destructive action is lessened. Concrete incorporating pozzolanic fly ash is also more resistant to attack by sulfate, mild acid, soft water, and seawater. The net effect is a greater sequestration of the captured mercury in the PACs contained in the concrete and significantly decreased exposure to the environment.

While not desiring to be limited by theory, the inventors believe that the keys to creating carbonaceous mercury sorbents that can be used together with fly ash in air-entrained concretes are: 1) a minimized PAC mesoporosity and, or, 2) a proper carbon surface chemistry. Activated carbons heretofore used for power plant mercury reduction do not possess these required properties to the required degrees. The required properties can be characterized by a new metric, denoted as the carbon's Acid-Blue Index or ABI. A sufficiently-low ABI indicates the required combination of minimal mesoporosity and proper surface chemistry necessary for a low degree of adsorption of air-entraining admixture chemicals in a concrete slurry. Activated carbons with sufficiently low ABIs have not heretofore been used for mercury emission reductions at coal-fired utility boilers.

Mesoporosity comprises the medium-sized pores and channels that link the large openings of the PAC particle to the high surface area of its microstructure. According to the International Union of Pure and Applied Chemistry's guidance on Reporting Physiosorption Data for Gas/Solid Systems (1985), activated carbon pores with widths less than 2 nm are considered micropores. Pores with widths between 2 and 50 nm are considered mesopores and pores with widths exceeding 50 nm are considered macropores.

Activated carbons are usually produced to have maximum surface areas for a given production cost, including high mesoporosity. In this way the mercury, or other target adsorbates, will have the least obstructions in finding sequestration sites in the mesopores and micropores. To create a concrete-friendly carbonaceous mercury sorbent, on the other hand, the carbon's mesoporosity must be minimized, while retaining adequate reactive microporosity. AEA compounds are relatively large molecules, on the order of one to three nanometers long. While not wishing to be limited by theory, it is believed that by minimizing the number of pores that the AEA molecules can fit in or be transported through, the amount of AEA that can be deleteriously adsorbed from the concrete slurry can also be minimized.

Figure 1:
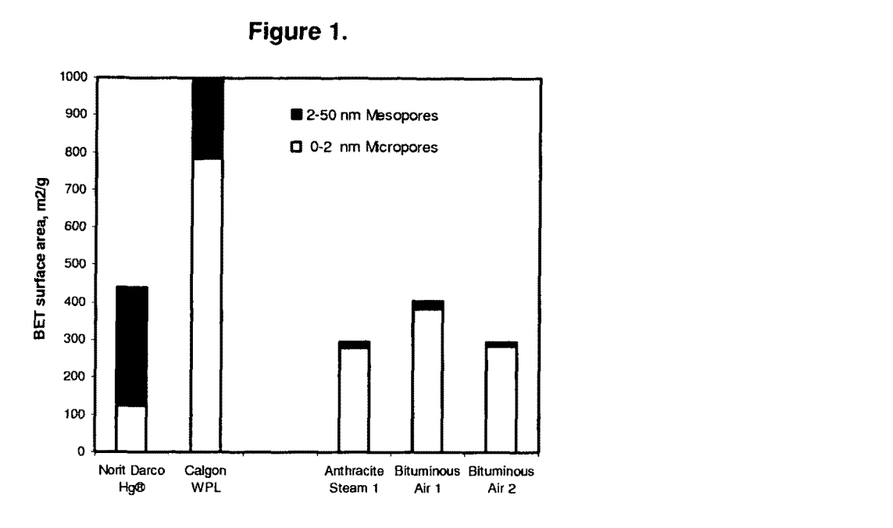
FIG. 1 is a bar chart contrasting the mesopore surface areas of example prior-art PACs and those of this invention.
Figure 2:
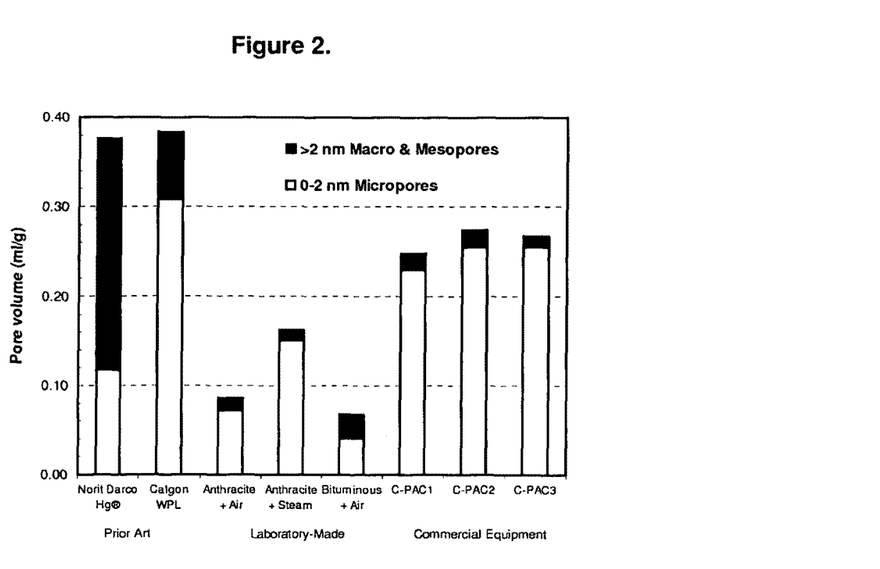
FIG. 2 is a bar chart contrasting the mesopore and macropore volumes of example prior-art PACs and those of this invention.

FIG. 1 contrasts the mesopore surface areas of example prior-art mercury PACs with those of the present invention. While the mercury PACs of the present invention all have microporous Brunauer-Emmett-Teller (BET) surface areas of over 200 $m^2/g$, they have mesopore surface areas of less than 40 $m^2/g$. The prior-art mercury PACs have BET mesoporous surface areas of well over 100 $m^2/g$. FIG. 2 similarly contrasts the calculated mesopore and macropore volumes of such PACs. Samples made both from anthracite with steam activation and from bituminous coal with air activation are included. The samples labeled "C-PAC" are concrete-friendly PACs of the invention made with large-scale commercial equipment from anthracite that will be elaborated on in Example 4.

While not wishing to be bound by theory, the inventors believe the particular surface chemistry of the carbonaceous mercury sorbent to be important in determining the degree of AEA adsorption on PACs. The presence of particular oxygen functional groups on the surface of the PAC and the net charge of the surface could promote or impede the attachment of AEAs. Oxygen-containing functional groups created during air activation should impart an acidic, hydrophilic character to the carbon surface which can repel the hydrophilic heads of the AEA molecules at pHs above the $pH_{pzc}$. By increasing the hydrophilicity of the PACs, for example, the adsorption of AEAs may be retarded, with little deleterious effect on gas-phase mercury adsorption.

Figure 3:
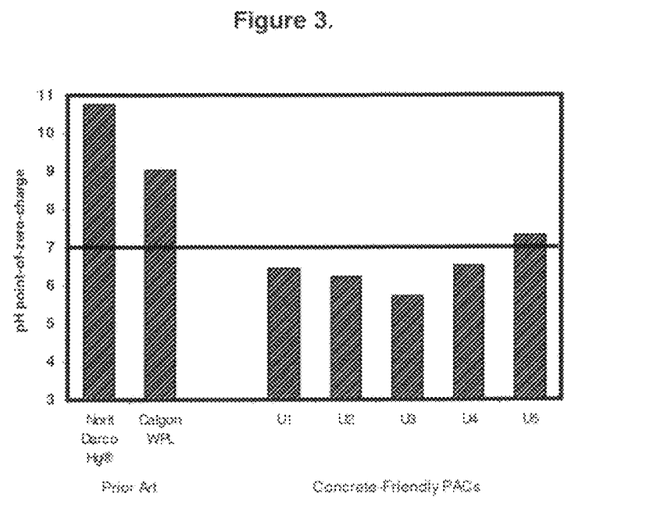
FIG. 3 is a bar chart contrasting the pH points-of-zero-charge of example prior-art PACs and those of this invention.

FIG. 3 contrasts the pH point-of-zero-charge, $pH_{pzc}$, of example prior-art PACs with examples for the invention. The $pH_{pzc}$s of the traditional PACs are quite high, indicating that their surfaces are more basic, more hydrophobic, and less polar. Their surfaces possess fewer negatively-charged sites which would repel the hydrophilic heads of the AEAs. The $pH_{pzc}$ of the air-activated PACs, on the other hand, are acidic or neutral, indicating that there are more acidic, hydrophilic, polar sites on their surfaces, yielding more negatively-charged sites to repel the AEA heads in the high pH environment of a concrete slurry.

Figure 5:
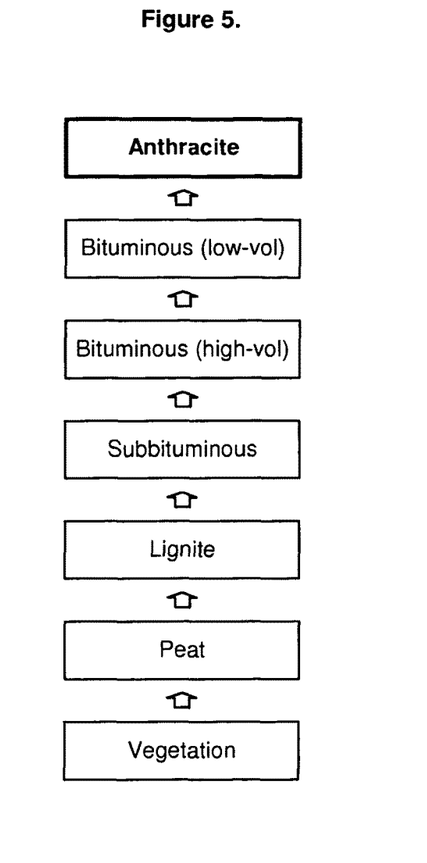
FIG. 5 is a block diagram indicating the relative rank of carbonaceous feedstocks utilized in producing carbonaceous mercury sorbents.

In the United States, traditional bulk activated carbons are commercially produced from wood and wood waste, from low-rank lignite, and from bituminous coal. Worldwide, activated carbons are also commercially produced from vegetation such as coconut shells and other nut shells or husks, peat, subbituminous coal, and anthracite as well. See FIG. 5, indicating the natural rank sequence, based on the percentage of fixed carbon, of carbonaceous feedstocks for bulk activated carbon production.

Surprisingly, the inventors have discovered that low-ABI carbons suitable for use in air-entrained concrete can be produced by specifically using anthracite as the original feedstock material. Anthracite, the very highest rank carbon source, apparently has a micro-structure such that even steam activation, if it is not too severe, can yield a low-ABI material that will remove significant mercury from flue gas streams. High-rank, low-volatile bituminous coal may be also used, but with results typically less favorable than with anthracite. Anthracite is defined by its fixed carbon level. ASTM D 388-05 provides a "Standard Classification of Coals by Rank." In it, anthracitic coals, including meta-anthracite, anthracite, and semi-anthracite, all contain greater than 86% fixed carbon on a dry, mineral-matter-free basis. As referred to herein, the term "anthracite" shall include all such anthracitic coals. Low volatile bituminous coal, which may also be used, contains at least 78% fixed carbon.

To produce concrete-friendly carbonaceous mercury sorbents, a carbonaceous feedstock must first be pre-processed. At the least, in the case of coal, the coal must be crushed to granular form, but preferably it is ground and extruded with a binder to form pellets for processing. With some coals it is necessary to pre-oxidize the surfaces to prevent caking.

Bulk commercial activated carbons are typically produced in a two-step process. First, the carbon-containing raw material is devolatilized with heat in an oxygen-depleted environment (less than 21 percent oxygen), driving off volatile compounds and carbonizing the material. The result is a char without a large internal surface area.

Second, the char is activated by eating away a large fraction of the remaining carbon with steam, carbon dioxide, or dehydrating chemicals, to leave a highly porous, high-surface-area structure behind. These two operations can be accomplished in separate equipment, or in different sections of one unit as with a multi-hearth furnace. After activation, the carbons must be ground to a powder fine enough to be fluidizable in a flue gas stream, with the majority of particles less than about 325 mesh U.S. sieve size. Prior art carbonaceous mercury sorbents produced in this manner can be effective at capturing mercury, but typically have ABIs of 50 to 150 mg/g. This makes them incompatible with AEA use.

The inventors have discovered that activating a carbonized char in air, or in an environment with free oxygen, rather than with steam or carbon dioxide, can significantly lower the resulting PACs' ABI. Such activation with oxygen imparts oxygen-containing functional groups on the PAC surface, which interferes with AEA adsorption. The resulting PACs may thus be compatible with AEA use.

To produce carbons with the lowest ABIs, and so the lowest effects on added AEAs, a combination of both an anthracite feedstock and activation, at least partially, in an environment with free oxygen can be utilized.

Carbons with a low ABI may also be post-treated with bromine, bromine salts, or other additives, for increased mercury capture performance. An example may be found in U.S. Pat. No. 6,953,494. The use of such mercury-performance-enhancing agents can be combined with this invention to increase the PACs' mercury capture.

Traditional activated carbon production equipment can be utilized without major modifications, if desired, to produce the concrete-friendly PACs. Changes to the first devolatilization/carbonization step in activated carbon production are not anticipated, except to compensate to the extent that an anthracite feedstock might replace a lower-rank feedstock. The devolatilization/carbonization step is still expected to occur in an oxygen-depleted environment, to prevent excessive combustion of the resulting carbonized char.

Some changes may be required in the second, activation, step if the activation agent is changed to air. Air activation is highly exothermic, compared to endothermic activation with steam and carbon dioxide, and must be tightly controlled to prevent runaway combustion. However, if done carefully, only modest changes to equipment and procedures may be necessary.

No post-treatment processing of the powdered activated carbon is required to lower its interaction with AEAs. Neutralization of AEA adsorption is to be inherent in the PAC production process itself. Treating the PAC with ozone or nitric acid or other strong oxidization agents to alter its surface is unnecessary. If a PAC is manufactured with a low enough ABI, such an additional treatment would not put its use outside of the intended coverage of this invention.

To produce a composition that can successfully lock away captured mercury in a strong, durable concrete, the low-ABI PAC and the fly ash should be intimately intermixed. This can be accomplished in the mercury removal process at the power plant.

Figure 4:
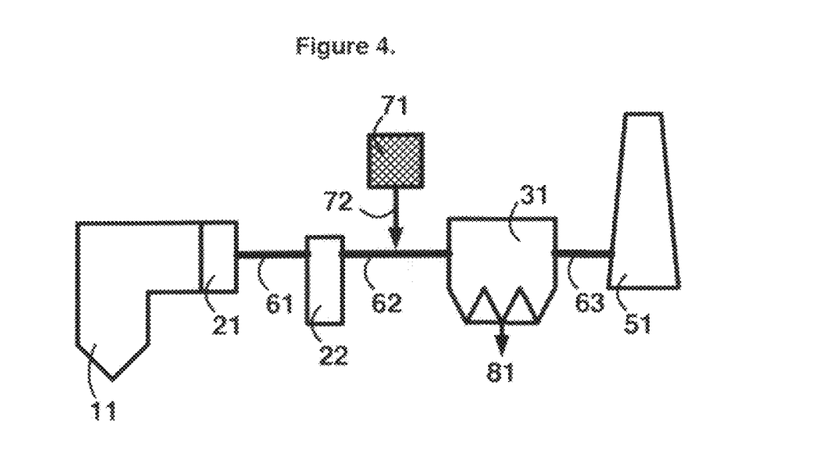
FIG. 4 is a diagram describing how mercury sorbents can be mixed with fly ash at a power plant to produce compositions that can be used as cement substitutes in concrete.

FIG. 4 schematically shows how the sorbents may be added to a combustion gas stream where a particulate collector, such as a fabric filter (baghouse) or a cold-side electrostatic precipitator (ESP) is utilized to collect the fly ash generated during combustion. Coal or lignite is combusted in a boiler 11 generating mercury-containing flue gas which is cooled by steam tubes and an economizer 21. The gas typically flows through ductwork 61 to an air preheater 22, which drops the gas temperature from about 300-to-400° C. down to about 150-to-200° C. in the ductwork 62 exiting the air preheater. In such an arrangement, the low-ABI mercury sorbent, stored in a container such as a bin 71, is fed to and through an injection line 72 to the ductwork 62 and injected through a multitude of lances to be widely dispersed in the hot combustion flue gas. Mixing with the flue gas, the PAC adsorbs its elemental mercury and oxidized mercury species. The sorbent flows with flue gas to a particulate collector 31 where it is deposited on the filter bags of a fabric filter or on the collection plates of the ESP. Cleansed of its mercury content and particulates, the flue gas exits the fabric filter to ductwork 63, the smokestack 51, and then to the atmosphere. Upon cleaning of the fabric filter bags or ESP collection plates, the low-ABI PAC and fly ash fall into hoppers and are eventually emptied from the particulate collector 81 to be stored and utilized, if possible, as a substitute for cement in air-entrained concretes. The PAC mercury sorbents will generally make up on the order of 1 to 3 wt % of the collected particulates in pulverized coal power-plant applications.

A similar application would be where a cement kiln was substituted for a boiler 11 and emitted exhaust gases containing mercury would be fed to a fabric filter similar to that shown as filter 31. A concrete-friendly PAC from a bin 71 could similarly be injected into the flowing gas 62 to be collected with fine entrained cement kiln dust particles in the fabric filter. The combination could be emptied from a collector 81, and sold for use in mortars and air-entrained concretes.

This disclosure frequently refers to powdered activated carbon and PACs as the carbonaceous mercury sorbents of interest. Those of skill in the art will recognize that active cokes, activated chars, and similar carbonaceous mercury sorbents can also be produced by the methods of this invention and these and similar materials are intended to be covered by its claims.

Novel compositions sometimes require novel metrics. Catalytic carbons, for example, can be identified by a special metric, the t-3/4 measurement defining such carbons in Matviya, U.S. Pat. No. 5,356,849. Similarly, the inventors discovered that concrete-friendly carbons can be created if they can satisfy the demands of a new metric, an Acid Blue 80 Index, or ABI. The ABI denotes the relative adsorption of acid blue 80, a standard dye (CAS No. 4474-24-2). To enable use sequestering mercury in typical air-entrained concretes, activated carbon must be created with a sufficiently low ABI. It was discovered that acid blue 80 has molecular properties relevant to AEAs in a concrete slurry. Acid blue 80 integrates the carbon surface chemistry and mesopore requirements for acceptable concrete air entrainment. Novel compositions combining low ABI carbonaceous mercury sorbents and coal combustion fly ash are capable of being successful used to sequester mercury in strong, durable, air entrained concretes.

If the carbon has a low effect on the resulting concrete void space, then there will be low variations in that effect when naturally-varying amounts of adsorbent contained in different fly ash shipments are sent to the ready-mix concrete plant. In this way, a standard AEA dosage can be used without fear that too few void spaces will be produced in the concrete, leading to cracking and disintegration upon freezing, or that too many void spaces will be created, with a consequent loss of required concrete strength.

First, a detailed description of the Acid Blue 80 Index is required. A carbonaceous mercury adsorbent's ABI indicates whether a fly ash incorporating it will be suitable for use in an air-entrained concrete which will sequester captured mercury. A carbon's ABI may be determined as described below.

A. Preparation of a Standard, Original Acid Blue 80 (AB-80) Solution 0.1000 g of AB-80 (CAS 4474-24-2, e.g. Acros Organics) is first dissolved in a small quantity of deionized water. The solution is transferred into a 1.0 liter volumetric flask and diluted to 1.0 liter. The concentration of the solution, $C_0$, is then determined as $$C_0 = W*1000$$

where:
$C_0$=concentration of original AB-80 solution, mg/l; and
W=mass of AB-80, g.

B. Deriving a working curve for the AB-80 solution 0, 1, 3, 5, 8, 12, 16, 20, and 25 ml, respectively, of the above AB-80 original solution is pipetted into 25 ml volumetric flasks and diluted to 25 ml using deionized water. The concentration of the solutions in each flask would be:

$$Cs = C_0 * Vs/25$$

where:
Cs=concentration of diluted AB-80 solution, mg/l;
$C_0$=concentration of original AB-80 solution, mg/l; and
Vs=volume of AB-80 solution pipetted, ml.

Using a spectrophotometer, the absorbencies of the above solutions are then determined at a wavelength of 626 nm. The absorbencies of the solutions are next plotted against their concentrations.

A linear working curve is obtained by applying a linear least-squares regression to the resulting data.

C. Sample Test Method. (for Guidance See ASTM D 3860-98 Standard Practice for Determination of Adsorptive Capacity of Activated Carbon by Aqueous Phase Isotherm Technique)

The AB-80 adsorptive capacity of an activated carbon is then determined by contacting the standard AB-80 solution with the activated carbon. The relative amount of AB-80 removed is determined by the difference of AB-80 solution absorbance prior to and after contacting with the activated carbon, calculating the adsorptive capacity from a Freundlich isotherm plot.

If the PAC has been chemically treated prior to testing, for example with bromine or a bromine salt, then the sample should first be washed or extracted by deionized or distilled water until no such chemical can be detected. For example, 5 grams of a brominated-PAC can be washed with 500 ml of water, then filtered, and then further rinsed with 1 liter water. The PAC sample should typically oven-dry at 150° C. for 3 hours prior to the AB-80 absorbance measurement.

Following the determination of a working curve for the AB-80 solution and the above-mentioned preparative steps, a carbonaceous mercury sorbent's Acid Blue 80 Index may be determined by using the following procedure:

Weigh various amounts of a PAC sample into 200 ml pre-cleaned flasks with stopper. For example, 4 different dosages may be used. The sample weights of the powdered activated carbon may have to be adjusted, depending on the adsorptive capacity of activated carbon. One guideline is the concentration of AB-80 solution after contacting activated carbon should fit into the linear range of AB-80 working curve.

Pipette 50 ml of AB-80 standard solution into each flask.

Shake and agitate the solutions for 30 minutes at 25° C.

Immediately filter the samples through 0.20 μm membrane filters, disposing of the first 5 ml of each filtrate.

Immediately analyze the filtrates using a spectrophotometer, measuring at a 626-nm wavelength, and calculate the concentration of the AB-80 filtrate solution by comparing the absorbance to the previously-derived working curve.

Record the concentration of AB-80 in the filtrate along with the corresponding carbon mass.

Calculate the AB-80 adsorbed, X, as follows:

$$X = V(C_0 - C)$$

where:
X=amount of AB-80 adsorbed, in mg;
$C_0$=concentration of original AB-80 solution prior to contact with the PAC, in mg/L;
C=concentration of the AB-80 solution after contacting the PAC, in mg/L; and
V=volume of AB-80 solution added, 0.05 L.

Determine the amount of AB-80 adsorbed per unit weight of the PAC, X/M, as follows:

$$X/M = (C_0 V - CV)/M$$

where:
X/M=AB-80 adsorbed per gram of carbon, in mg/g;
M=mass of the PAC, g.

Calculate the logarithm of C, the concentration of AB-80 solution after the contacting PAC in mg/l, and the logarithm of (X/M), the AB-80 adsorbed per gram of carbon in mg/g. Plot log C on the abscissa and log(X/M) on the ordinate, and using linear least-squares regression correlate the data. If the square of the correlation coefficient, $R^2$, is less than 0.90, repeat steps 1-9 until a better correlation is obtained.

Extrapolate the linear trend line to log $C_0$, the original AB-80 concentration, and calculate the corresponding X/M from log(X/M) at $C_o$. The X/M at $C_o$ in the linear log C versus log(X/M) trend-line is the AB-80 Acid-Blue Index, or ABI, of the carbon sorbent sample.

EXAMPLES

Comparative Example 1

Prior Art Mercury Sorbents

Powdered activated carbons (PACs) used in full-scale power plant mercury control trials were procured from major commercial carbon vendors. The Acid Blue 80 Indexes of these PACs were determined by the method of this invention.

These values appear below in Table 1.

TABLE 1

| Ref | Producer | Product | Precursor | Activation | ABI |
|---|---|---|---|---|---|
| A | Norit | Darco ® Hg | Lignite | Steam | 124 |
| B | Norit | Darco ® Hg-LH | Lignite | Steam | 120 |
| C | Calgon | FluePAC ® | Bituminous | Steam (reactivated) | 40 |
| D | Calgon | WPL | Bituminous | Steam | 80 (avg.) |
| E | Carbochem | FGC | Bituminous | Steam | 45 |
| F | Mead/Westvaco | Nuchar ® SA | Wood | Chemical | 60 |

These prior art mercury sorbents have very high ABIs and cannot be used above de minimis levels with fly ash in air-entrained concretes due to their high adsorption of AEAs.

Example 1

Novel Concrete-Friendly Carbons

Powdered activated carbon mercury sorbents with low ABIs for compositions of this invention were produced in the laboratory using the customary two-step devolatilization/carbonization and activation sequence. They were produced in a laboratory fluidized bed reactor, rather than a kiln or furnace, but those skilled in the art will recognize that similar materials could be produced in a kiln and furnace or multi-hearth furnace by modifying the pertinent equipment temperatures, residence times, and other relevant processing parameters. The various coal feedstocks came from coal suppliers and The Pennsylvania State University's Coal Sample Bank, the latter samples denoted PSOC.

First, all of the different coal feedstock samples were was crushed and sized. Materials between 50-mesh size and 100-mesh size (U.S. Standard Series sieves) were then gradually devolatilized and carbonized in a hot, inert atmosphere ($N_2$) in the fluidized bed reactor. The devolatilization and carbonization step was generally accomplished by heating to 150° C. at about 100° C./hour, then from 150° C. to 550° C. at about 250° C./hour, and finally from 550° C. to 850° C. at about 300° C./hour. The low-volatile bituminous sample was pre-oxidized with about 2.5 l/min of $O_2$ at 300° C. for 2 hours prior to devolatilization to prevent caking. The lignite sample was devolatilized and carbonized to 850° C. at about half the rate as the others over a longer period.

Carbonized chars made from each coal rank were activated in air with 20.9% oxygen. Additional chars made from anthracite were also activated in an inert environment with steam. The PACs that underwent activation in air did so at 450° C. for about 3 hours under an air flow of approximately 2.5 l/min of $O_2$ per kg of raw coal feed. The PACs that underwent steam activation did so at about 850° C. with about 0.20 kg of steam per hr per kg of raw coal feed. The PACs that underwent activation in both environments did so for about half the time at each condition.

After activation, the materials were cooled down to ambient temperatures under an inert gas atmosphere. The resultant activated carbons were then ground to a size less than 325-mesh and their acid blue 80 index values were determined.

The resulting PACs' mercury removal abilities were also ascertained after first being brominated to 5 wt % according to the method provided by U.S. Pat. No. 6,953,494. The mercury-capture performance of the resultant brominated PACs were then tested in an 85 m³/hr (50-acfm) pilot duct-injection system with a simulated coal-fired flue-gas stream. The mercury mass transfer to the entrained sorbent and the adsorption kinetics in this system were similar to that in a full-scale utility application. The fully-instrumented duct-injection test system that was used included a methane burner unit to generate the hot flue gas; a humidification drum to add an appropriate degree of moisture to the gas; a mercury spiking sub-system with elemental mercury or mercury chloride permeation tubes; a flue gas spiking sub-system with mass flow controllers for $SO_2$, $NO_x$, and HCl; a small sorbent feeder and fluidizing injection sub-system to lessen sorbent pulsing; 10 meters of insulated, 10-cm-diameter ducting circling the ceiling; thermocouples, an electrostatic filter with an effective specific collection area (SCA) of about 2500 $m^2/kNm^3$ (500 $ft^2$/Kacf); a back-up fabric filter; a safety filter; an orifice plate to measure flow; and a variable-speed induced-draft fan. The gas temperature at injection was about 175° C. and at the ESP was about 145° C. The spiked flue-gas concentrations were approximately 10 μg/$Nm^3$Hg, 600 ppm $SO_2$, 300 ppm $NO_x$, and 5 ppm HCl, which are typical values for a flue gas at a coal-fired power plant. Mercury measurements before and after sorbent injection were taken using a continuous cold vapor atomic adsorption (CVAA) mercury analyzer, the Ohio Lumex Model 915. The sorbent injection rate used was about 90 mg/$Nm^3$ (4 lb/MMacf).

All of the PACs exhibited acceptable mercury removal capabilities and all were manufactured with acceptable yields. Lignite naturally has lower yields because of its high innate moisture and volatiles.

The Acid Blue 80 Indexes of these materials were then determined and are presented in Table 2.

TABLE 2

| Ref | Source | Precursor | Activation | Hg Removal | Yield | ABI |
|---|---|---|---|---|---|---|
| 1 | PSOC 1442 | Lignite | Air | 48% | 22% | 21 |
| 2 | Consol Coal | Bitum-LV | Air | 51% | 56% | 7 |
| 3 | Jedo Coal | Anthracite | Steam | 69% | 74% | 4 |
| 4 | PSOC 1558 | Anthracite | Steam | 58% | 69% | 10 |
| 5 | Jedo Coal | Anthracite | Air | 58% | 78% | 2 |
| 6 | PSOC 1558 | Anthracite | Air/Steam | 85% | 50% | 15 |
| 7 | PSOC 1558 | Anthracite | Steam/Air | 69% | 60% | 6 |

These examples of mercury sorbents for the compositions of this invention all have ABIs of 21 mg/g or lower, which is far lower than the prior art mercury sorbents in Comparative Example 1, which had ABI's of 40 mg/g or greater. Their surface chemistries and/or pore structures thus allow them to be mixed with fly ash to sequester captured mercury in air-entrained concretes and mortars.

PACs 1 and 2 were unconventionally activated in air. PACs 3 and 4 were activated traditionally utilizing steam, but were manufactured from anthracite.

To achieve the lowest ABI and have the least deleterious effect on air-entraining admixtures, PAC 5 combined both techniques, utilizing anthracite and activation in air. PACs 6 and 7 also achieved excellent results by utilizing anthracite and partial air activation.

Figure 6:
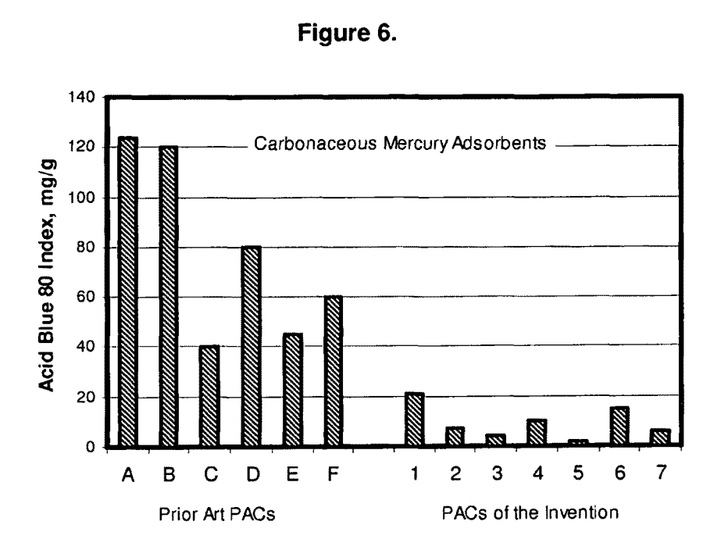
FIG. 6 is a bar chart contrasting the Acid Blue Indexes of prior-art PACs with those of the invention.

FIG. 6 contrasts the ABIs of these mercury-adsorbent PACs with those of the prior art from Comparative Example 1.

Example 2

Air-Entrained Concretes with Prior Art and Novel PACs

Fly-ash-containing concretes with either a prior-art mercury sorbent PAC, or a PAC of this invention, were produced to examine their relative resulting air entrainment. The Norit Darco® Hg prior-art sorbent, with an ABI around 120, was compared to PAC 2 from Example 1, an air-activated carbon with an ABI of 7.

Concrete samples of four different compositions were produced. Each contained portland cement, fly ash replacing a typical 20% of the cement, sand, aggregate, water, and a standard amount of a common air-entraining admixture, Darex® II (W.R. Grace, Cambridge, Mass.). The fly ash came from We Energies' Pleasant Prairie power plant, a representative utility mercury control site.

One of the concrete formulations contained no mercury PAC. Another of the compositions contained Darco® Hg mixed in with respect to the fly ash at 1.0 weight-percent, a level representing a modest mercury sorbent injection rate at a power plant. The remaining two compositions contained the PAC 2 from Example 1 mixed in with the fly ash at both 1.0 wt % and 3.0 wt %, the latter representing a very high sorbent injection rate and, consequently, a higher possible degree of AEA interference if the sorbent was not compatible with concrete use.

The concrete samples were prepared according to ASTM C 192 "Standard Practice for Making and Curing Concrete Test Specimens in the Laboratory." Multiple samples from each batch were tested for their wet air entrainment according to ASTM Method C 231 "Standard Test Method for Air Content of Freshly Mixed Concrete by the Pressure Method" and their values averaged.

The air-entrainment specification for concrete is usually selected at a point within the range of 4 to 7 percent by volume. The higher the specified air entrainment, the more AEA is are added to the blend. In these tests entrained air of 6 percent by volume was targeted. Each sample included Darex II® AEA at a dosage of 52 ml per 100 kg of cement and fly ash. The results are provided in FIG. 7.

Figure 7:
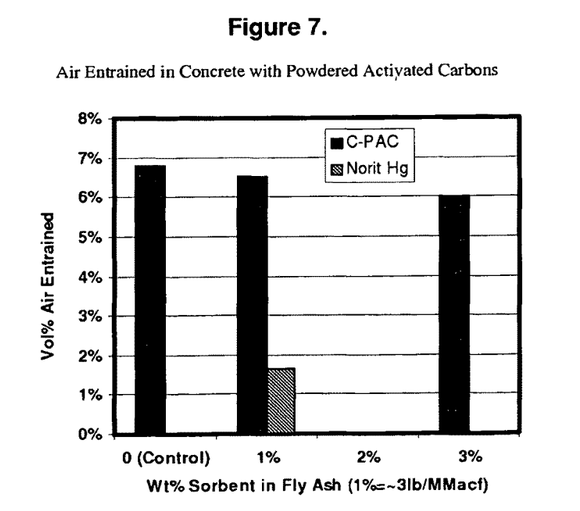
FIG. 7 is a bar chart contrasting the volumes of air voids entrained in wet concretes made with a PAC of this invention and both a plain concrete and one containing a prior-art PAC.

With no AEA (not shown), the standard-method concrete naturally has less than 2 percent by volume of air entrained, which is why AEAs are added. As shown in FIG. 7, with no PAC, but with the proper amount of AEA, the concrete sample achieved a targeted 6 percent by volume entrained air (leftmost black bar, labeled "0 (Control)").

When only 1 percent by weight of a high-ABI PAC, Norit's Darco Hg®, is added to the fly ash portion, the AEA agent in the mix is made useless (short gray bar). The AEA is adsorbed by this PAC and the resulting degree of air entrainment is nearly the same as the natural level, i.e. the level of air entrainment without any AEA chemicals. However, if 1 percent by weight, or even 3 percent by weight of the low-ABI PAC of this invention is used as the mercury sorbent, then the proper amount of air is entrained in the concrete and a fly ash containing such a sorbent is suitable for commercial sale as a cement substitute.

Figure 8:
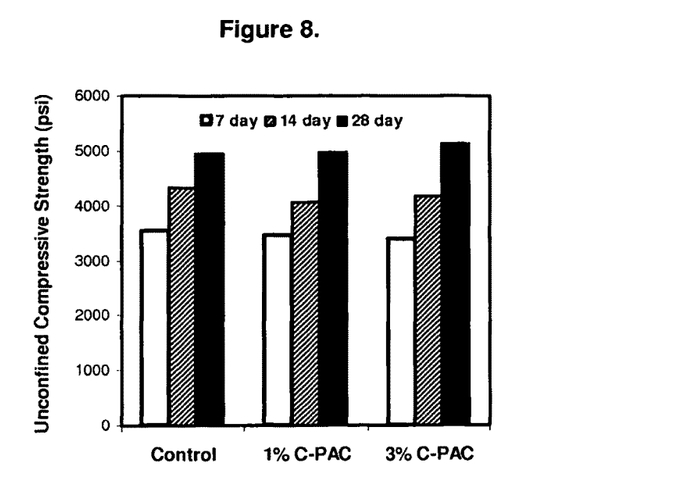
FIG. 8 is a bar chart indicating the compressive strengths of concrete samples made containing 0, 1, and 3 weight-percent of a concrete-friendly PAC.

As provided in FIG. 8, concrete compression strength tests were performed on various samples of the FIG. 7 concretes made according to ASTM C 192 that had cured for 7, 14, and 28 days. When tested according to ASTM C 39 "Standard Test Method for Compressive Strength of Cylindrical Concrete Specimens," the concretes with PAC 2 at 1 and 3 weight percent with respect to the fly ash exhibited compressive strengths equivalent to that of the control samples which had no mercury sorbents present in the fly ash.

Example 3

Additional PACs

Additional PACs were produced according to methods of Example 1, all with steam activation. The relevant parameters and results are provided in Table 3 below.

Many different anthracites can be used to produce concrete-friendly mercury sorbents with traditional steam activation. The feedstocks for PACs 3 and 4 from Example 1, for example, were from different sources. The former came from the Jedo Coal Company and the latter, from The Pennsylvania State University Coal Sample Bank.

TABLE 3

| Ref | Source | Precursor | Hg Removal | Yield | ABI |
|---|---|---|---|---|---|
| 3 | Jedo Coal Co. | Anthracite | 69% | 74% | 4 |
| 4 | PSU PSOC 1558 | Anthracite | 58% | 69% | 10 |
| 8 | Consolidation Coal-Buchanan | Bitum-LV | 30% | 75% | 1 |
| 9 | Thompson Bros. Mining | Bitum-HV | 80% | 27% | 80 |

It is also possible to make a concrete-compatible mercury sorbent from a bituminous coal without having to resort to air activation if the feedstock has sufficiently-low volatility. PAC 8 had a very low ABI, but it was not fully activated and its mercury removal rate was low. It is envisioned that slightly more activation would have brought its yield down and mercury removal rate up. This would have raised its ABI, but still to an acceptably low level. PAC 9, from a high-volatile bituminous coal, on the other hand, had an ABI of 80 and so was not a concrete-compatible mercury sorbent.

Example 4

Full Scale Production and Injection of Concrete-Friendly Mercury Sorbents

Mercury sorbents for compositions of the present invention have been produced utilizing common full-scale activated carbon production line equipment. First, anthracite feedstocks were ground and pelletized with a binder, then slowly devolatilized and carbonized in an oxygen-depleted environment in a rotary kiln, activated with steam in an activation furnace, and then ground. While anthracite feedstocks allow for the production of concrete-friendly mercury sorbents if properly manufactured, they do not automatically produce PACs with low ABIs. The temperatures, residence times, steam rates, and other process parameters were iteratively chosen to produce materials of sufficiently low ABI. Under the inventors' direction, a total of 50 metric tons (110,000 lbs) of such anthracite PACs, hereinafter denoted "C-PAC," were produced from three different plants with the characteristics indicated in Table 4.

TABLE 4

| Ref | Precursor | ABI | Hg Removal |
|---|---|---|---|
| 10 | Anthracite | 8 | 75% |
| 11 | Anthracite | 10 | 85% |
| 12 | Anthracite | 8 | 80% |

These concrete-friendly materials were then brominated to 5 wt % bromine using the gas-phase bromination process of U.S. Pat. No. 6,953,494. Much of the sorbent was then shipped to the Chicago, Ill. Crawford Station of Midwest Generation EWE to test their mercury removal capabilities, as well as the acceptability of fly ashes incorporating them to be used in air-entrained concretes.

Figure 9:
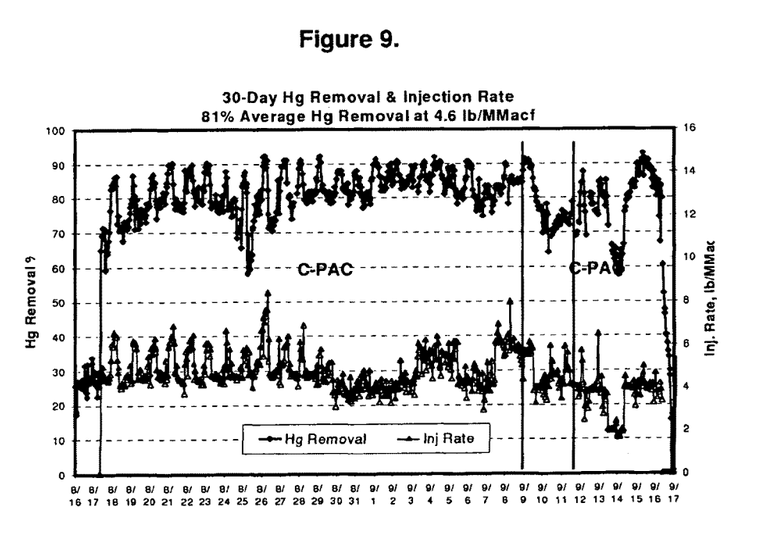
FIG. 9 is a graph of injection rates and the degree of mercury emission reduction achieved and C-PAC injection over 21 days by injecting the mercury sorbents of this invention into the flue gas at varying rates at the Crawford Station of Midwest Generation.

For nearly one month these three PACs were injected into the flue gas of one half of the 234 megawatt Unit 7 at this plant at an average injection rate of about 110 mg/Nm$^3$ of gas (4.6 pounds of PAC per million actual cubic feet of gas). Over this period, the materials reduced the mercury emissions at the plant by an average of slightly over 80%. See FIG. 9.

After injection into the ductwork, the sorbent particles intimately mixed with the fly ash particles already entrained in the hot flue gas stream and the two materials were collected together in the plant's particulate collector. In this case the particulate collector was a common multiple-field cold-side electrostatic precipitator (ESP).

The majority of the fly ash and PAC materials was collected in the front ESP hoppers, with a minority, PAC-enriched fraction, in the rear hoppers. The carbon content of the fly ash from the front hoppers averaged about 2.5% (LOI, loss-on-ignition) and that of the rear hoppers about 4.4% (LOI).

Figure 10:
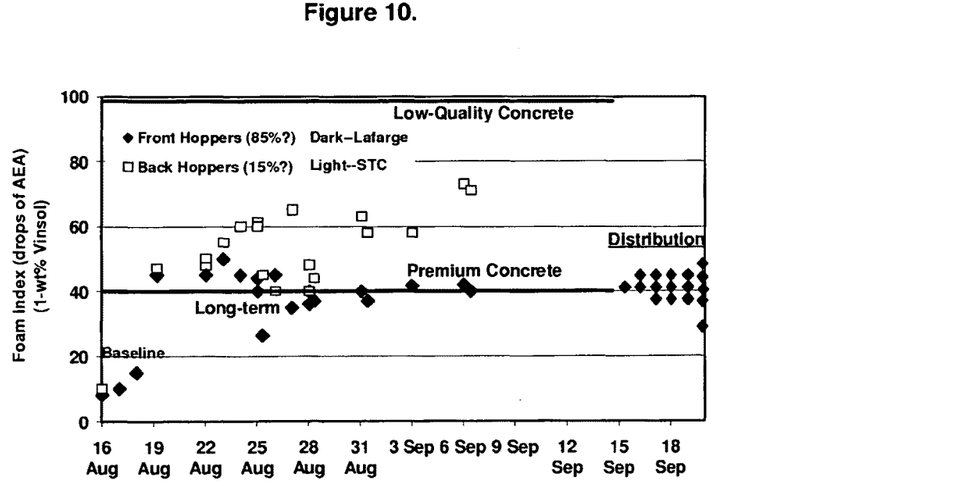
FIG. 10 is a graph that plots the Vinsol® resin foam index values determined for various hopper fly ash samples over a 21-day period at the Crawford Station.

Fly ash samples from the hoppers were taken over the first three weeks of mercury sorbent injection. Foam index measurements were performed on these fly ash samples, which are reported in FIG. 10. The foam index is relative measure of the degree that a particular fly ash adsorbs a particular AEA in a mixture with water. Drops of the AEA, in this case a 1 wt % solution of Vinsol® resin (CAS No. 8050-09-7), were titrated into the fly ash/water mixtures (30 g fly ash in 70 ml of water) until the carbon in the fly ash became saturated with the AEA and a stable foam formed after agitation. The number of drops of the AEA solution constituted the foam index values. At this plant, the fly ash could be sold as a substitute for cement in concretes if the fly ash had a Vinsol® resin foam index below 100 drops. With a foam index below 40 drops, it could be sold for premium concrete. The foam indexes of all of the fly ash samples incorporating the mercury sorbents of this invention had foam indexes below 100 drops and those from the front hoppers were around 40 drops.

Figure 11:
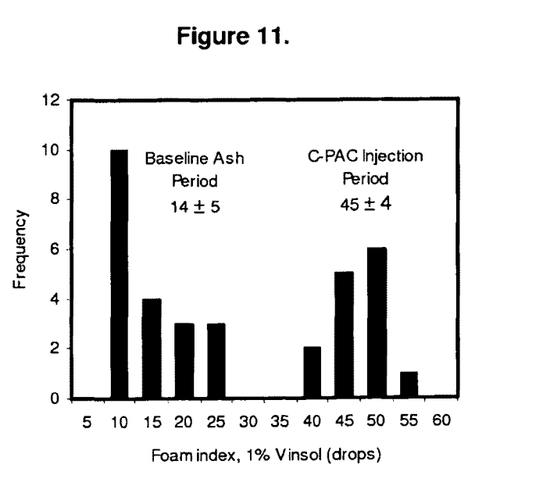
FIG. 11 is a bar chart that indicates the relative distributions of foam index values prior to sorbent injection and during the concrete-friendly PAC injection period.

During PAC injection, the distribution of foam index values of the resulting fly ashes was properly narrow and even improved compared to the pre-injection baseline period. FIG. 11 provides front-hopper foam index distribution data for both periods. Due to the varying unburned carbon levels naturally found in the fly ash, the foam index values of the pre-PAC-injection fly ash batches being sold to the ready-mix concrete plants varied irregularly, possibly resulting in some concretes with too few or too many air voids if a constant amount of AEA were added to each batch, as is common practice. Although a modestly higher rate of AEA addition was required with the fly ashes containing the concrete-friendly PACs, the distribution of foam index values was more uniform and damped out the deleterious effects of varying unburned carbon.

Air-entrained concretes were made with the Crawford Station fly ash compositions of the invention to establish their suitability as a cement substitute. Aiming for 6 vol % air voids in the wet concretes, standard samples were made containing no fly ash, baseline fly ash without the PACs, and fly ash containing the injected sorbent. The particular PAC in the fly ash sample used in the PAC-containing concretes of the rest of this Example was the anthracite-derived Reference 12 C-PAC material, which possessed an ABI of 8. Its fly ash contained 2.8 wt % carbon (loss-on-ignition) and required 79.6 ml of Darex® II AEA per 100 kg of cement and fly ash, with fly ash substituting for 20% of the cement. The samples with the baseline fly ash, without any PAC, on the other hand, had a fly ash carbon content of 0.4 wt % (LOI) and required AEA at 41.2 ml/100 kg with the 20% fly ash substitution ratio.

Figure 12:
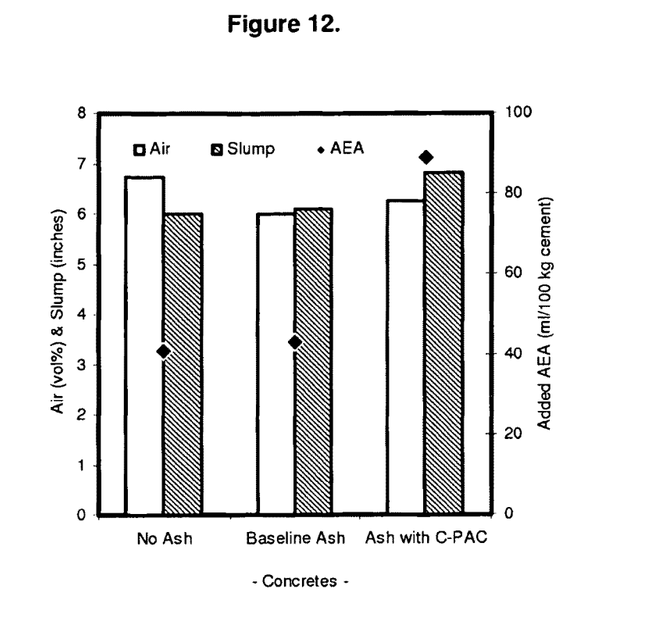
FIG. 12 is a bar chart that presents concrete data for wet-entrained-air and slump, along with the amount of AEA added, for three concrete formulations.

The concrete samples were prepared according to ASTM C 192. As described in FIG. 12, the average slump values of multiple samples of concrete mixes incorporating the C-PAC and those without it were all acceptably around 15 centimeters (6 inches). Wet air void contents were measured according to ASTM C 231. Each sample acceptably exhibited about 6 vol % voids. The presence of the C-PAC did not negatively affect wet air entrainment.

Figure 13:
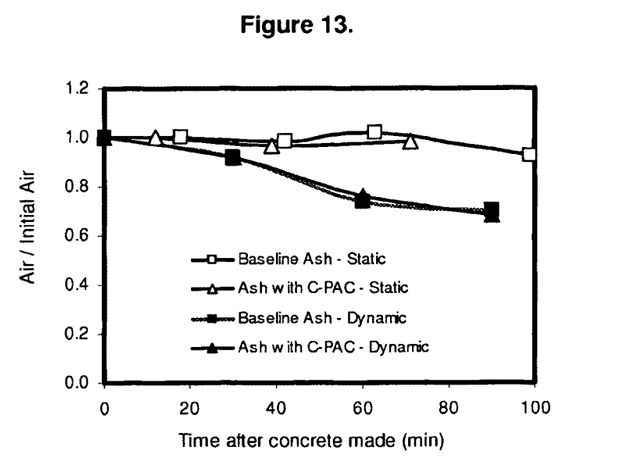
FIG. 13 is a graph that indicates static and dynamic air stability data for concretes with baseline fly ash and fly ash containing a PAC of this invention.

The stability of the air voids over time was also measured in both static and dynamic (e.g. the rotating drum of a concrete truck) settings. The air void stability data are found in FIG. 13. There were no statistical differences in the stability of the entrained air voids between the PAC-free concretes and those incorporating the C-PAC.

Figure 14:
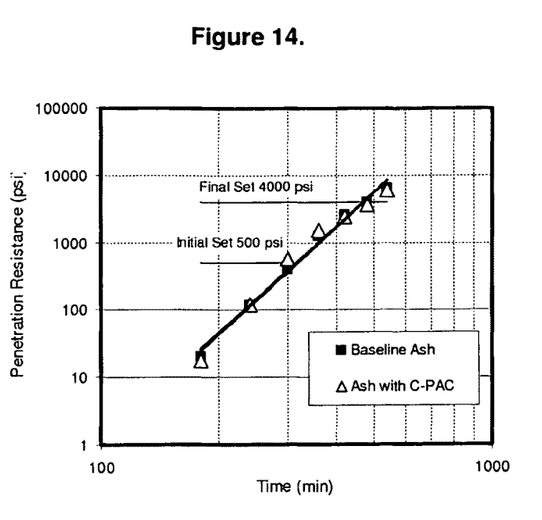
FIG. 14 is a graph that plots setting-time data for baseline concrete and for a concrete containing a PAC of this invention.

The setting-time profile of the concretes was also evaluated. This data can be found in FIG. 14. The times of the initial and final concrete sets were found to be the same whether the concrete contained C-PAC or not.

Figure 15:
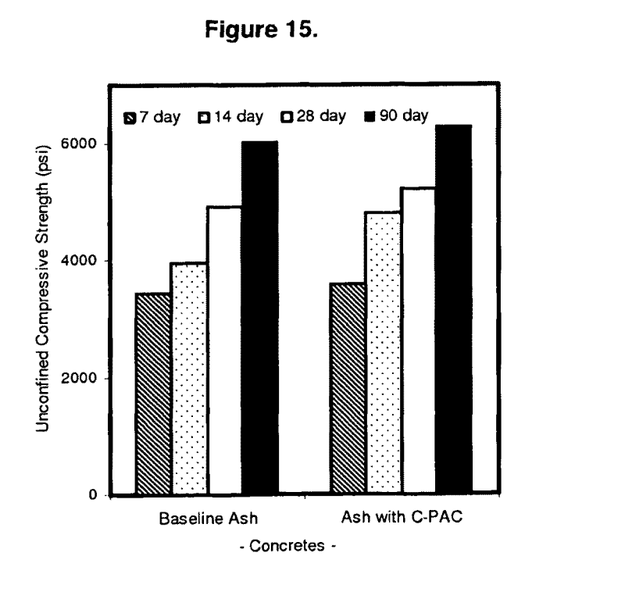
FIG. 15 is a bar chart that describes the compressive strengths of concrete samples made with and without a PAC from this invention.

The average strengths of the resulting hardened concretes were determined for multiple samples. Average values can be found in FIG. 15 for 7, 14, 28, and 90 days of curing. Concretes with ashes containing the C-PAC exhibited strengths at least as high as those without it.

Hardened concrete samples were sent to a commercial concrete testing laboratory (Concrete Research & Testing LLC, Columbus, Ohio) for microscopic air void analysis, ASTM C 457. They reported the measurements reported in Table 5 below.

TABLE 5

|  | Baseline Concrete | Concrete with C-PAC | Acceptable Range |
|---|---|---|---|
| Total Air Void Content, vol % | 4.5% | 5.6% | 4.0-6.0 |
| Voids >1 mm, % | 0.71% | 0.65% | — |
| Void Frequency, voids/in. | 11.0 | 12.0 | — |
| Spacing Factor, in. | 0.0055 | 0.0054 | 0.0040-0.0080 |
| Cement Paste Content, % | 31.3% | 28.3% | — |
| Specific Surface Area, m$^2$ | 984 | 865 | >600 |

The microscopic air voids of the concrete containing the C-PAC, and of that of the concrete without the mercury sorbent, were virtually the same and both exhibited values within the acceptable ranges.

We claim:
1. A method comprising:
providing a carbonaceous mercury sorbent precursor;
activating or reactivating the carbonaceous mercury sorbent precursor by a method consisting essentially of activating with steam, or free oxygen, or both, to provide an activated carbonaceous mercury sorbent, wherein the activation temperature and time period is limited such that the Acid Blue 80 Index of the activated carbonaceous mercury sorbent with no post-treatment does not exceed 30 mg per gram of sorbent;
grinding the activated carbonaceous mercury sorbent with no post-treatment to an average particle size less than about 325 mesh;
injecting the activated carbonaceous mercury sorbent with no post-treatment into a gas stream containing mercury, mercury-containing compounds, or a combination thereof, and fly ash, cement kiln dust, or a combination of fly ash and cement kiln dust, and allowing the activated carbonaceous mercury sorbent with no post-treatment to contact the mercury or mercury-containing compounds to create mercury sorbent with adsorbed mercury;
removing the mercury sorbent with adsorbed mercury along with fly ash, cement kiln dust, or both, from the gas stream in a particulate control device; and adding the mercury sorbent with adsorbed mercury along with fly ash, cement kiln dust, or both, to water, cement, and an air-entraining admixture to provide a cementitious or pozzolanic composition.

2. The method of claim 1 additionally comprising adding sand and coarse aggregate.

3. The method of claim 1, wherein activating the carbonaceous mercury sorbent precursor consists essentially of activating with steam.

4. The method of claim 3, wherein the carbonaceous mercury sorbent precursor consists of anthracite or low-volatile bituminous coal.

5. The method of claim 3, wherein the carbonaceous mercury sorbent precursor consists of anthracite.

6. The method of claim 1, wherein activating the carbonaceous mercury sorbent precursor consists essentially of activating with free oxygen.

7. The method of claim 6, wherein the carbonaceous mercury sorbent precursor consists of anthracite.

8. The method of claim 1, wherein activating the carbonaceous mercury sorbent precursor is performed using a rotary kiln, activation furnace, or multi-hearth furnace.

9. The method of claim 1, wherein the activation is further limited in temperature and time period such that the Acid Blue 80 Index of the activated carbonaceous mercury sorbent with no post-treatment does not exceed 15 mg per gram of sorbent.

10. The method of claim 9, wherein activating the carbonaceous mercury sorbent precursor consists essentially of activating with steam.

11. The method of claim 10, wherein the carbonaceous mercury sorbent precursor consists of anthracite or low-volatile bituminous coal.

12. The method of claim 10, wherein the carbonaceous mercury sorbent precursor consists of anthracite.

13. The method of claim 9, wherein activating the carbonaceous mercury sorbent consists essentially of activating with free oxygen.

14. The method of claim 13, wherein the carbonaceous mercury sorbent precursor consists of anthracite.

15. The method of claim 9, wherein activating the carbonaceous mercury sorbent precursor is performed using a rotary kiln, activation furnace, or multi-hearth furnace.

16. A composition comprising:
a powdered activated carbon having mercury or mercury-containing compounds adsorbed thereon, the powdered activated carbon consisting of a carbonaceous mercury sorbent precursor that was activated or reactivated with steam or free oxygen, or both, such that the Acid Blue 80 Index of the activated carbonaceous mercury sorbent with no post-treatment does not exceed 30 mg per gram of sorbent;
either fly ash, cement kiln dust, or a combination thereof; and
cement, an air-entraining admixture, sand, and water.

17. The composition according to claim 16, additionally comprising coarse aggregate.

18. The composition according to claim 17,
wherein the carbonaceous mercury sorbent precursor is selected from the group consisting of anthracite coal and low volatile bituminous coal.

19. The composition according to claim 17,
wherein the carbonaceous mercury sorbent precursor is anthracite.

20. The composition according to claim 17,
wherein the activated carbonaceous mercury sorbent with no post-treatment has an Acid Blue 80 Index of less than about 15 milligrams per gram of sorbent.

21. The composition according to claim 20, additionally comprising coarse aggregate.

22. The composition according to claim 21,
wherein the carbonaceous mercury sorbent precursor is selected from the group consisting of anthracite and low volatile bituminous coal.

23. The composition according to claim 22,
wherein the carbonaceous mercury sorbent precursor is anthracite.

24. The composition according to claim 21,
wherein the carbonaceous mercury sorbent precursor is activated or reactivated with free oxygen.

25. A method comprising:
providing a carbonaceous mercury sorbent precursor;
activating or reactivating the carbonaceous mercury sorbent precursor by a method consisting essentially of activating with steam or free oxygen, or both, to provide an activated carbonaceous mercury sorbent, wherein the activation temperature and time period is limited such that the Acid Blue 80 Index of the activated carbonaceous mercury sorbent with no post-treatment does not exceed 30 mg per gram of sorbent;
treating the activated carbonaceous mercury sorbent with bromine or a bromine salt;
grinding the treated activated carbonaceous mercury sorbent to an average particle size less than about 325 mesh;
injecting the treated activated carbonaceous mercury sorbent into a gas stream containing mercury, mercury-containing compounds, or a combination thereof, and fly ash, cement kiln dust, or a combination of fly ash and cement kiln dust, and allowing the treated activated carbonaceous mercury sorbent to contact the mercury or mercury-containing compounds to create mercury sorbent with adsorbed mercury;
removing the mercury sorbent with adsorbed mercury along with fly ash, cement kiln dust, or both, from the gas stream in a particulate control device; and
adding the mercury sorbent with adsorbed mercury along with fly ash, cement kiln dust, or both, to water, cement, and an air-entraining admixture to provide a cementitious or pozzolanic composition.

26. A composition comprising:
a powdered activated carbon having mercury or mercury-containing compounds adsorbed thereon, the powdered activated carbon consisting of a carbonaceous mercury sorbent precursor that was activated or reactivated with steam or free oxygen, or both, such that the Acid Blue 80 Index of the activated carbonaceous mercury sorbent with no post-treatment does not exceed 30 mg per gram of sorbent, wherein the activated carbonaceous mercury sorbent is treated with bromine or a bromine salt;
either fly ash, cement kiln dust, or a combination thereof; and
cement, an air-entraining admixture, sand, and water.

* * * * *